US006169264B1

(12) United States Patent
Marhic

(10) Patent No.: US 6,169,264 B1
(45) Date of Patent: Jan. 2, 2001

(54) NOZZLE/NOZZLE CARRIER ASSEMBLY FOR A PLASMA TORCH

(75) Inventor: Gérard Marhic, Cergy Pontoise (FR)

(73) Assignee: La Soudure Autogene Francaise, Paris (FR)

( * ) Notice: Under 35 U.S.C. 154(b), the term of this patent shall be extended for 0 days.

(21) Appl. No.: 09/443,048

(22) Filed: Nov. 18, 1999

(51) Int. Cl.[7] .................. B23K 10/00

(52) U.S. Cl. .................. 219/121.5; 219/121.48; 219/75

(58) Field of Search .................. 219/74, 75, 121.48, 219/121.5, 121.51, 121.36

(56) References Cited

U.S. PATENT DOCUMENTS 4,059,743 11/1977 Esibian et al. .
4,590,354 * 5/1986 Marhic et al. .................. 219/121.5
4,649,257 * 3/1987 Yakovlevitch et al. ......... 219/121.52
4,805,807 2/1989 Perne et al. .
4,891,489 * 1/1990 Bollinger et al. ............... 219/121.48

FOREIGN PATENT DOCUMENTS 0 528 528 2/1993 (EP) .

* cited by examiner

*Primary Examiner*—Mark Paschall
(74) *Attorney, Agent, or Firm*—Young & Thompson

(57) ABSTRACT

Male/female assembly for a plasma torch comprising:

Figure 1:
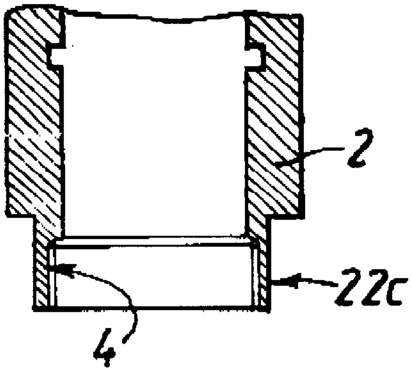

a nozzle (1) forming a male portion, a nozzle carrier (2) forming the female portion to receive said nozzle (1), characterized in that the nozzle (1) comprises, on its external periphery, at least one helicoidal ramp (14) and at least one recess (15) extending over all the axial length (L) of the ramp, and in that the nozzle carrier (2) comprises, on its internal peripheral surface, at least one projection (21) adapted to coact with at least one helicoidal ramp (14) of the nozzle (1), so as to be able to ensure holding the nozzle (1) in position in the nozzle carrier (2).

12 Claims, 2 Drawing Sheets

NOZZLE/NOZZLE CARRIER ASSEMBLY FOR A PLASMA TORCH

The present invention relates to a nozzle/nozzle carrier assembly for a plasma torch, to a plasma torch provided with such an assembly and to a process for welding, cutting or marking with a plasma arc adapted to use such a torch or an assembly according to the invention.

Conventionally, plasma torches are comprised of a torch body with, in its rear portion, connections to fluid supply channels, particularly for plasmagenic gas, and electrical power and, in its front portion, means for mounting/securing the electrode body and the nozzle of the torch.

In certain cases, so as particularly to facilitate the maintenance and/or replacement of the used or defective pieces, the torch can be provided with quick assembly/disassembly means, as described in the document EP-A-599709, which is incorporated herein by reference.

As will be set forth in detail hereafter, in conventional plasma torches, the nozzle is fixed to a support element called a nozzle carrier.

In this type of mounting, the securement and centering of the nozzle on the nozzle carrier are in general principally ensured by screw threads carried by one portion of the external peripheral wall of the nozzle.

However, it has been noted that in case of accidental overheating, intense use of the torch and/or fouling of these elements, securement problems arise leading to accelerated deterioration of the nozzle carrier, and hence to more frequent replacement of said nozzle carrier and/or of said nozzle and, correspondingly, to an increase of cost.

The object of the present invention is therefore to overcome the above drawbacks by providing a nozzle/nozzle carrier assembly for plasma torches whose structure permits particularly solving this problem of securement, whilst improving the centering of the nozzle on the nozzle carrier, and which will be quick mounting/demounting.

The present invention thus relates to a male/female assembly for a plasma torch comprising:

- a nozzle forming the male portion and comprising at least one upstream portion having a diameter D1, at least one intermediate portion having a diameter D2 and at least one downstream portion having, immediately adjacent the intermediate portion, a diameter D3, said intermediate portion being located between said upstream portion and downstream portion, said diameters D1, D2 and D3 being such that D3>D1>D2, and
- a nozzle carrier forming the female portion, which is adapted to receive said nozzle, said male/female assembly being characterized:
- in that the nozzle comprises, on the external periphery of said upstream portion, at least one helicoidal ramp and at least one recess extending over at least all the axial length (L) of said helicoidal ramp, and
- in that the nozzle carrier comprises, over its internal peripheral surface and adjacent its downstream end, at least one projection adapted to coact with at least one helicoidal ramp of the nozzle, so as to be able to ensure holding in position of the nozzle in the nozzle carrier by means of at least said projection and at least said ramp, after securement at least by rotation of said nozzle in said nozzle carrier.

As the case may be, the male/female assembly according to the invention can comprise one or several of the following characteristics:

- the nozzle has several helicoidal ramps, preferably at least three helicoidal ramps;
- the nozzle carrier comprises several projections, preferably at least three projections;
- a recess is provided between each helicoidal ramp and/or extending over at least a portion of the intermediate portion of the nozzle;
- the internal profile of the nozzle carrier, at its downstream end, corresponds substantially to the external profile of the nozzle, at its upstream portion.

The invention also relates to a nozzle adapted to constitute the male portion of a male/female assembly according to the invention and a nozzle carrier adapted to constitute the female portion of such an assembly.

According to another aspect, the invention also relates to a plasma torch, an automatic machine or any other similar mechanized device comprising a nozzle and/or a nozzle carrier adapted to constitute at least one of the portions of a male/female assembly according to the invention.

According to still another aspect, the invention deals with a process for cutting, welding or marking with a plasma arc adapted to use a plasma torch according to the invention.

The present invention will now be described in greater detail and with reference to the accompanying drawings, which are given by way of illustration, not limitation.

FIG. 1 is a schematic longitudinal cross-sectional view of a portion of a nozzle carrier 2 according to the prior art, which comprises at its downstream end 22*c* a tapping 4.

Figure 2:
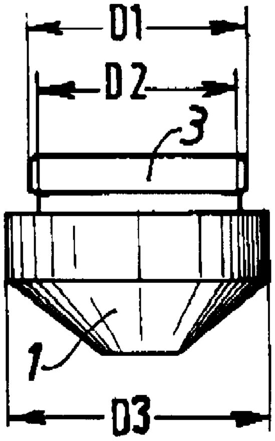

FIG. 2 shows a nozzle 1 according to the prior art, which comprises an upstream portion comprising over its external periphery a screw thread 3, adapted to be screwed into the tapping 4 of the nozzle carrier 2 of FIG. 1.

These structures of nozzle 1 and nozzle carrier 2 are found conventionally in plasma torches of the prior art.

Conversely, FIGS. 3 to 11 show nozzles and nozzle carriers according to the present invention.

Figure 3:
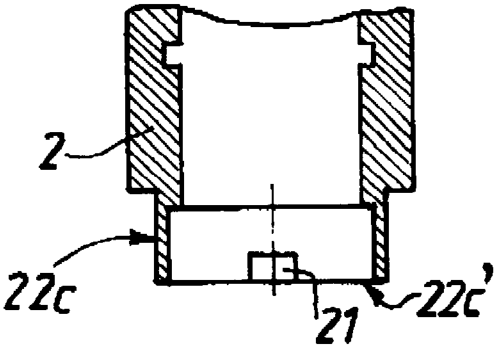

More particularly, FIG. 3 is a schematic view of a nozzle carrier 2, in longitudinal cross-section, adapted to constitute the female portion of a male/female assembly for a plasma torch according to the invention, which nozzle carrier 2 comprises, over its internal periphery, adjacent its downstream end 22*c*, one or several projections 21, of three in this case. These projections 21 are shown more clearly in FIG. 5, which is a view from below, which is to say from the downstream end 22*c*, of the nozzle carrier 2 of FIG. 3.

Figure 4:
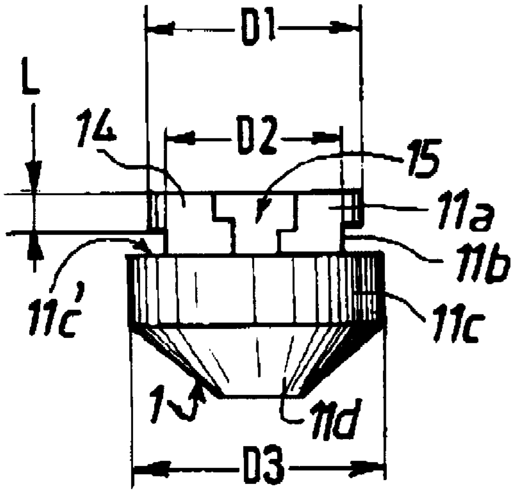

Moreover, FIG. 4 shows a side view of a nozzle 1 adapted to constitute the male portion of a male/female assembly for a plasma torch according to the invention. More precisely, it will be seen in this FIG. 4 that the nozzle 1 comprises an upstream portion 11*a* having a diameter D1, an intermediate portion 11*b* having a diameter D2 and a portion 11*c* having, immediately adjacent its intermediate portion 11*b*, a diameter D3, said diameters D1, D2 and D3 being such that:

$$D3>D1>D2.$$

In the embodiment shown here, the terminal end lid of the nozzle 1 is substantially conical; however, such a shape is not a limitation of the invention.

It will be seen moreover that the nozzle 1 comprises on its external periphery of the upstream portion 11*a*, one or several helicoidal ramps 14, here three in number.

Figure 8:
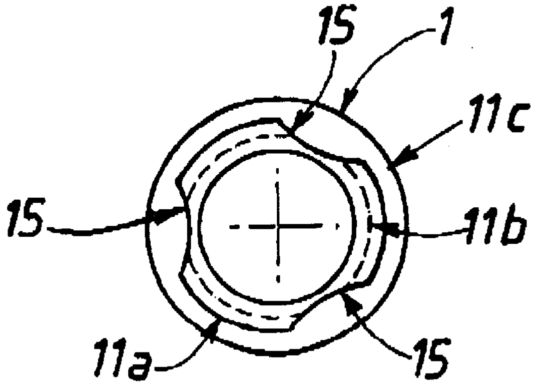

Moreover, between each one of these ramps 14, an axial recess 15 has been provided over all the axial length L of the upstream portion 11*a* and has been, in this case, prolonged over all the length of the intermediate portion 11*b*. In the embodiment of FIG. 4, the number of recesses 15 is also three, as is shown in FIG. 8, which is a view from above of the nozzle 1 of FIG. 4.

Figure 6:
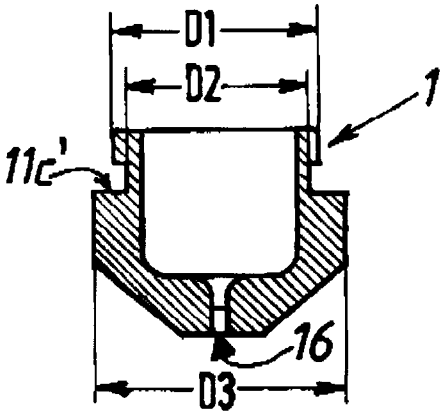

FIG. 6 itself shows a schematic longitudinal cross-sectional view of the nozzle 1 according to the invention, in which the structure of the nozzle 1 and in particular the outlet conduit or opening 16 is shown, by which the plasmagenic flow leaves, during operation of a plasma torch in a plasma cutting operation for example.

Figure 5:
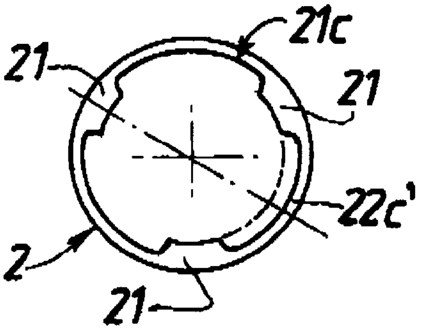

Preferably, the profile of the upstream portion 11*a* of the nozzle 1, comprising the recesses 15, corresponds substantially to the internal profile of the downstream end 22*c* of the nozzle carrier 2, said downstream end 22*c* carries the projections 21, as shown in FIG. 5.

Figure 7:
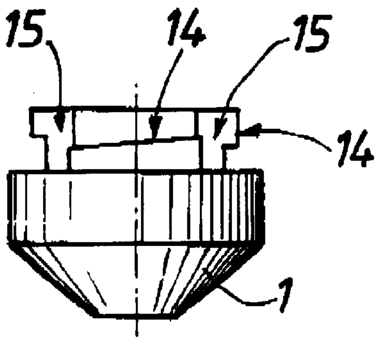

FIG. 7 shows schematically a nozzle 1 identical to that of FIG. 4, but angularly offset by an angle of about 60°.

Figure 9:
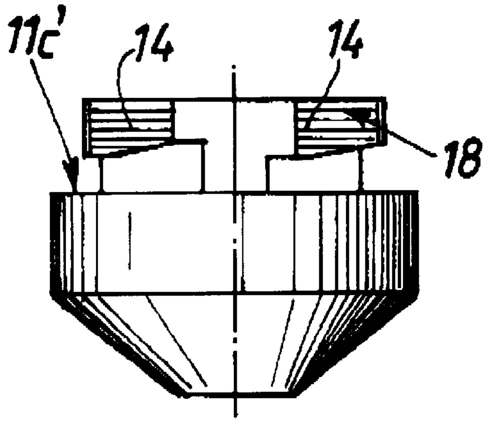
Figure 10:
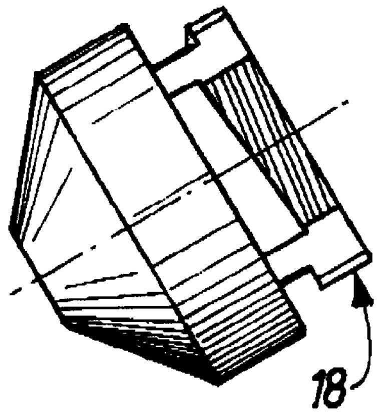
Figure 11:
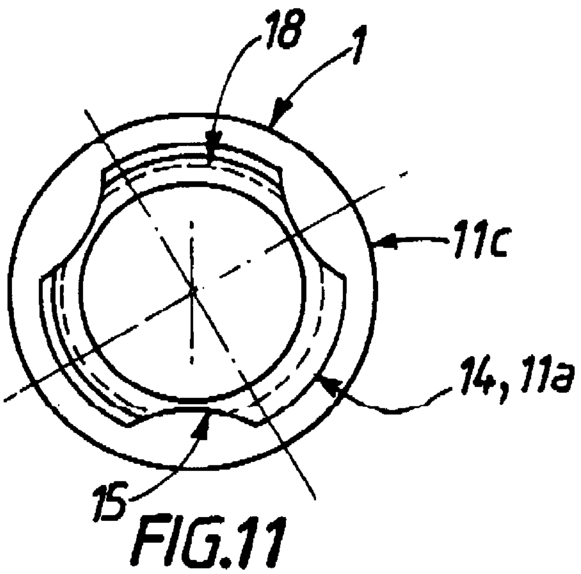

FIGS. 9 to 11 show a second embodiment of the invention, in which the helicoidal ramps 14 of the nozzle 1 have screw threading 18; the other portions of the nozzle 1 remain unchanged.

More precisely, FIG. 9 shows a side view of a nozzle 1 with helicoidal ramps 14 screw threaded at 18, and FIG. 10 shows the nozzle 1 of FIG. 9 in a view angularly offset by about 60°, and FIG. 11 shows a view from above, which is to say from the side of the upstream portion 11*a*, of the nozzle 1 of FIGS. 9 and 10.

Generally speaking, the setting up, which is to say the operation of mounting and securing, of nozzle 1 on the nozzle carrier 2 is carried out by a successive insertion in translation of nozzle 1 into the nozzle carrier 2 by causing the projections 21 of the nozzle carrier 2 to pass into the recesses 15 of the nozzle 1, then a securement by rotation of the nozzle 1 in the nozzle carrier 2, such that the projections 21 coact with the helicoidal ramps 14 to ensure holding in position of said nozzle 1 in said nozzle carrier 2.

Preferably, the securement by rotation, that is to say by screwing, is carried out until the circular wall 11*c*' of the downstream portion 11*c* of the nozzle 1 comes to bear, that is to say abuts, against the circular end 22*c*' of the end 22*c* of the nozzle carrier 2.

The nozzle/nozzle carrier assembly for a plasma torch according to the invention can be used in any operation of welding, cutting or plasma marking requiring the use of a manual or automatic plasma torch adapted to be provided with such a nozzle/nozzle carrier assembly or with one of these elements taken alone.

What is claimed is:

1. Male/female assembly for a plasma torch comprising:

a nozzle (1) forming the male portion and comprising at least one upstream portion (11*a*) having a diameter D1, at least one intermediate portion (11*b*) having a diameter D2 and at least one downstream portion (11*c*) having, immediately adjacent the intermediate portion (11*b*), a diameter D3, said intermediate portion (11*b*) being located between said upstream portion (11*a*) and downstream portion (11*c*), said diameters D1, D2 and D3 being such that D3>D1>D2, and a nozzle carrier (2) forming the female portion, which is adapted to receive said nozzle (1), said male/female assembly being characterized:

in that the nozzle (1) comprises, over the external periphery of said upstream portion (11*a*), at least one helicoidal ramp (14) and at least one recess (15) extending over at least all the axial length (L) of said helicoidal ramp (14), and in that the nozzle carrier (2) comprises, over its internal peripheral surface and adjacent its downstream end (22*c*), at least one projection (21) adapted to coact with at least one helicoidal ramp (14) of the nozzle (1), so as to be able to ensure holding in position of the nozzle (1) in the nozzle carrier (2) by means of at least said projection (21) and at least said ramp (14), after securement by means of rotation of said nozzle (1) in said nozzle carrier (2).

2. Male/female assembly according to claim 1, characterized in that the nozzle (1) has several helicoidal ramps (14), preferably at least 3 helicoidal ramps (14).

3. Male/female assembly according to claim 1, characterized in that the nozzle carrier (2) comprises several projections (21), preferably at least three projections (21).

4. Male/female assembly according to claim 1, characterized in that a recess (15) is provided between each helicoidal ramp (14) and/or extending over at least a portion of the intermediate portion (11*b*) of the nozzle (1).

5. Male/female assembly according to claim 1, characterized in that the internal profile of the nozzle carrier (2), at its downstream end (22*c*), corresponds substantially to the external profile of the nozzle (1), at its upstream portion (11*a*).

6. Nozzle (1) adapted to constitute the male portion of a male/female assembly according to claim 1, characterized in that it comprises, over the external periphery of its upstream portion (11*a*), at least one helicoidal ramp (14) and at least one recess (15) extending over at least all the axial length (L) of said helicoidal ramp (14).

7. Nozzle carrier (2) adapted to constitute the female portion of a male/female assembly according to claim 1, characterized in that it comprises, over its internal peripheral surface and adjacent its downstream end (22*c*), at least one projection (21) adapted to coact with at least one helicoidal ramp (14) of a nozzle (1).

8. Plasma torch, characterized in that it is provided with a male/female assembly according to claim 1, with a nozzle and nozzle carrier according.

9. Automatic machine for welding, cutting or marking with a plasma arc, characterized in that it is provided with a male/female assembly according to claim 1, with a nozzle (1), with a nozzle carrier and/or with a plasma torch.

10. Process for welding, cutting or marking with a plasma arc, characterized in that there is used a plasma torch according to claim 8.

11. Nozzle (1) for a plasma torch comprising at least one upstream portion (11*a*) having a diameter D1, at least one intermediate portion (11*b*) having a diameter D2 and at least one downstream portion (11*c*) having, immediately adjacent the intermediate portion (11*b*), a diameter D3, said intermediate portion (11*b*) being located between said upstream portion (11*a*) and downstream portion (11*c*), said diameters D1, D2 and D3 being such that D3>D1>D2, and further comprising, over the external periphery of said upstream portion (11*a*), at least one helicoidal ramp (14) and at least one recess (15) extending over at least all the axial length (L) of said helicoidal ramp (14).

12. Plasma torch with a nozzle according to claim 11.

* * * * *